N. O. HENDERSON.
HAY LOADER.
APPLICATION FILED JAN. 29, 1907.
916,310.
Patented Mar. 23, 1909.
3 SHEETS—SHEET 1.
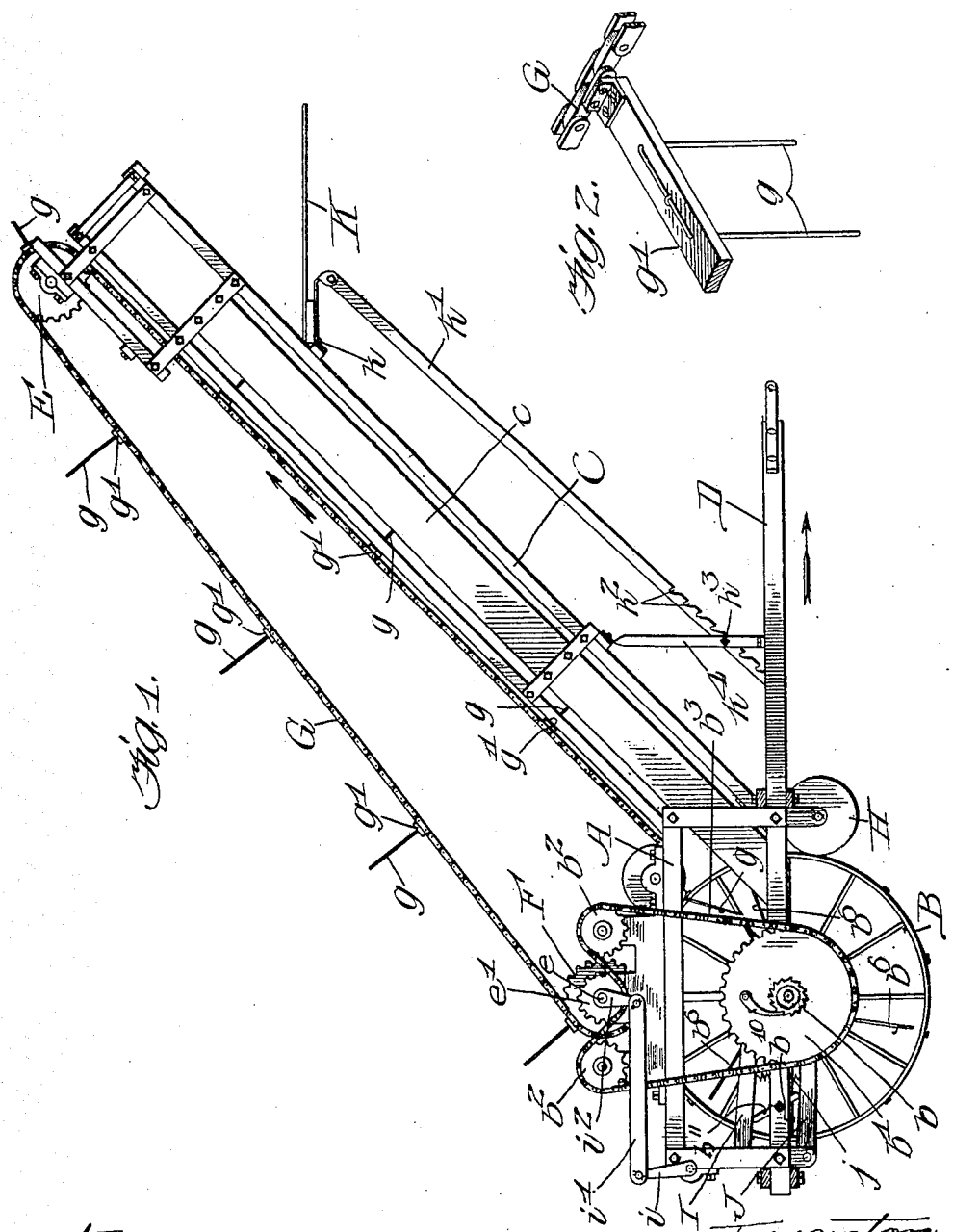

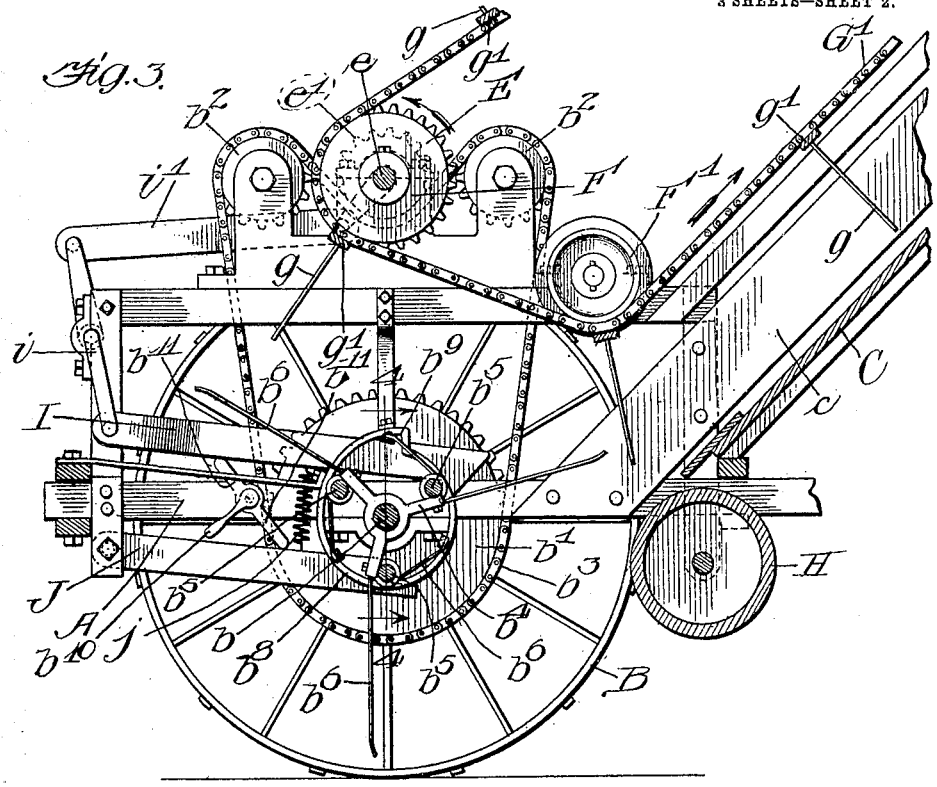
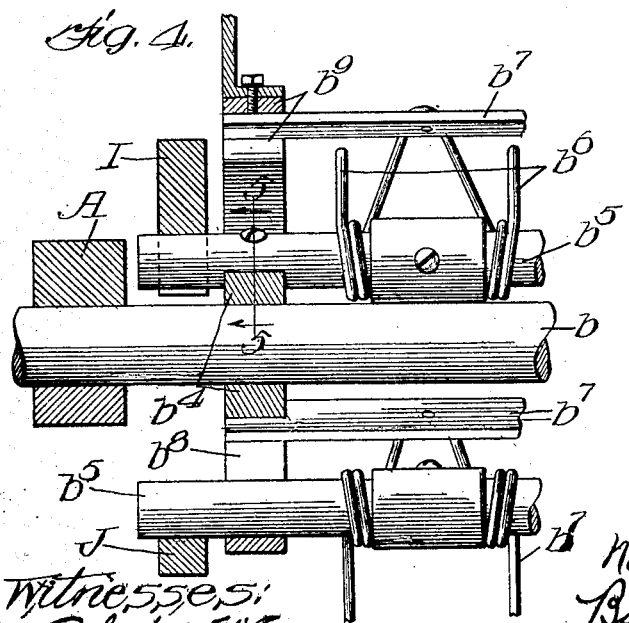
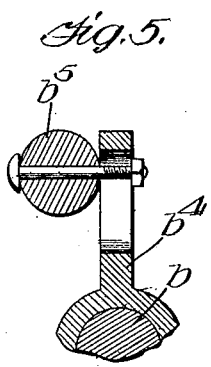

N. O. HENDERSON.
HAY LOADER.
APPLICATION FILED JAN. 29, 1907.
916,310.
Patented Mar. 23, 1909.
3 SHEETS—SHEET 3.
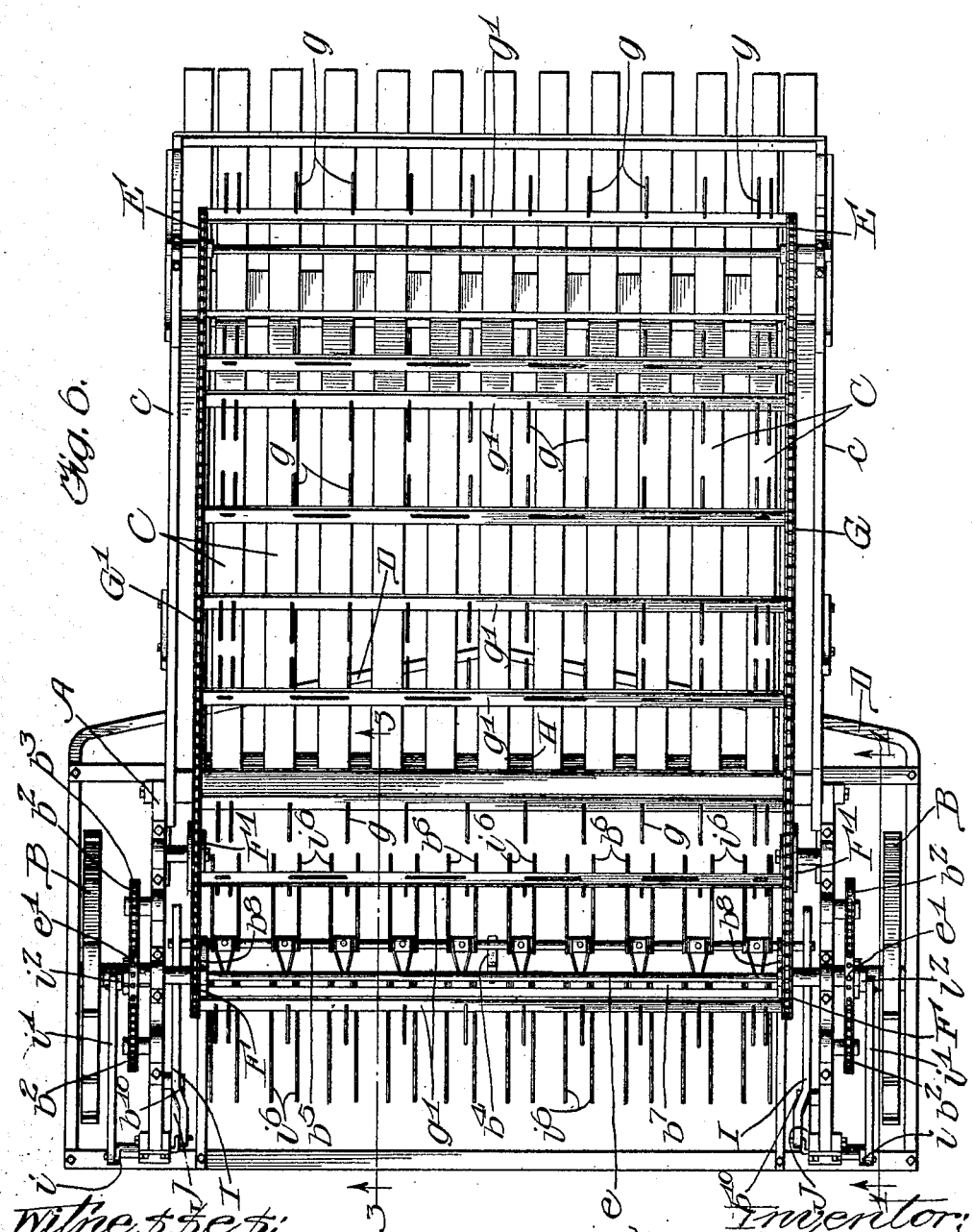

UNITED STATES PATENT OFFICE.

NORMAN O. HENDERSON, OF LOST NATION, IOWA, ASSIGNOR TO ROCK ISLAND PLOW COMPANY, OF ROCK ISLAND, ILLINOIS, A CORPORATION OF ILLINOIS.

HAY-LOADER.

No. 916,310.      Specification of Letters Patent.      Patented March 23, 1909.

Application filed January 29, 1907. Serial No. 354,661.

*To all whom it may concern:*

Be it known that I, NORMAN O. HENDERSON, a citizen of the United States of America, and resident of Lost Nation, Iowa, have invented a certain new and useful Improvement in Hay-Loaders, of which the following is a specification.

My invention relates to hay loaders of that type in which the loading machinery is drawn behind a wagon, the hay loader raking up the hay and automatically loading it onto the wagon. In hay loaders of this character, it is essential that the raking be done cleanly and effectively, and that all hay thus raked up be delivered smoothly and effectively to the point of its discharge onto the wagon. In order to accomplish these and other desirable results, I employ rake teeth which are mounted to revolve about an axis,—that is to say, which are given a rotary motion like the teeth on the drum or rotary member with which some hay loaders are provided. In order to produce a more effective raking action, however, as well as a better and more effective delivery of the raked-up hay to the elevator, I provide rake teeth which have an intermittent rotary motion,—that is to say, which do not revolve continuously about the common axis, but which revolve or rotate for a short distance and then stop. In this way, one set of rake teeth is raking up the hay while another set is in position to deliver the hay to the elevator, and at such time all of the rake teeth are held temporarily stationary. As soon as sufficient ground has been covered and an accumulation of hay has formed in the lower rake teeth, and the set of teeth just ahead thereof has fully delivered its load to the elevator, the entire number of sets of rake teeth are then given another step forward.

The elevator of my improved hay loader comprises an endless chain provided with elevator teeth, both strands or portions of the endless conveyer being arranged above the floor or upwardly inclined structure upon which the hay is given an upward sliding movement until it reaches the point of discharge. With such arrangement, wherein the entire conveyer or elevator chain is entirely outside of the said floor or incline, it is possible to discharge the hay not only at the upper end of said incline, but also at any suitable intermediate point, inasmuch as any portion of the incline having the proper provisions for so doing can be swung down for the purpose of discharging the hay at an intermediate point in the upward direction of travel thereof. In this way the loader can be trailed behind the wagon or hay-rack in the ordinary manner, and the hay picked up by the intermittently rotated rake teeth is effectively delivered to the lower end of the elevator, at which point the upwardly traveling elevator teeth catch the hay and cause it to slide upwardly upon the incline or floor of the elevator. With such construction and mode of operation, I find that the hay is cleanly and effectively raked up as the machine travels over the ground, and that each set of rake teeth is adapted to effectively deliver its load to the lower end of the elevator, thus insuring a clean raking of the field. Furthermore, the coöperation of the raking mechanism and the elevator mechanism is such that no clogging or overloading is likely to take place. The nature and advantages of my invention will, however, hereinafter more fully appear.

In the accompanying drawings, Figure 1 is a side elevation of a hay loader embodying the principles of my invention, the rear wheel being removed for convenience of illustration. Fig. 2 is a perspective of a portion of the endless conveyer or elevator. Fig. 3 is an enlarged section on line 3—3 in Fig. 6. Fig. 4 is an enlarged section on line 4—4 in Fig. 3. Fig. 5 is a detail section on line 5—5 in Fig. 4. Fig. 6 is a plan of the hay loader shown in Fig. 1. With further respect to Fig. 1, it will be seen that the same is in the nature of a sectional view on line 1—1 in Fig. 6.

As thus illustrated, my improved hay loader comprises a body or frame A of any suitable character, mounted upon wheels B and provided with an upwardly and forwardly extending floor or incline C. A reach or tongue D is provided for attaching the loader to a hay-rack or wagon in the ordinary manner. Upper and lower sprocket wheels E and F are mounted respectively on the upper and lower end of the said floor or incline and the said body or frame. A guide pulley F¹ is also mounted on the said frame or body, but at a point somewhat nearer the said floor or incline. Over these sprocket wheels and the guide pulley is trained or arranged an endless link belt G provided with elevator teeth $g$, it being observed that a similar link belt $G^1$ is arranged at the other side of the machine, and that for this purpose the said sprockets and guide pulley are duplicated at said other side of the machine. The two endless link belts are connected by the bars $g^1$ upon which the said elevator teeth are mounted. It will be seen that the arrangement is such that the entire endless conveyer thus provided is above or outside of the said floor or incline, and that the hay is caused to slide or move upwardly on said floor or incline by the upward movement of the elevator teeth in the direction indicated by the arrows. Furthermore, it will be seen that the direction of travel from the sprockets F to the guide pulley $F^1$ is forward and slightly downward, and that the motion then is changed abruptly to an upward direction. The sprockets F are mounted upon a shaft $e$ which carries a smaller sprocket wheel $e^1$ at each end thereof. The axle $b$ of the wheels is provided with larger sprockets $b^1$, and guide sprockets $b^2$ are mounted upon the upper portion of the said frame or body A. With such an arrangement, a transmission of power from the ground wheels B to the elevator is accomplished through the medium of sprocket chains $b^3$, one at each side of the machine, as shown in the drawings. It will be seen that these two sprocket chains $b^3$ are trained over the guide sprockets $b^2$, under the sprocket $e^1$, and around and under the sprockets $b^1$. Consequently, when the loader is drawn forward, the ground wheels operate the endless conveyer or elevator in the manner shown and described, causing the hay to slide upwardly upon the floor or incline C, which latter is provided with side boards $c$ to prevent the hay from falling off.

A roller or cylinder H is mounted crosswise of the machine at a point just below the lower edge of the said floor or incline, in order to more thoroughly insure a good delivery of the hay from the raking mechanism to the elevator. Upon the said axle $b$ are mounted at each end thereof a pair of spiders $b^4$ which are slidingly connected with the rake tooth bars $b^5$, in the manner shown more clearly in Fig. 5, whereby each rake tooth bar is capable of movement toward and away from the axle $b$—that is to say, toward and away from the axis about which the rake teeth revolve. These rake teeth $b^6$ are coiled upon said rake teeth bars $b^5$, as shown more clearly in Fig. 4, and have the inner or doubled ends thereof secured to the auxiliary bars $b^7$, it being understood that these, as well as the bars $b^5$, extend transversely of the machine. At each side of the frame there is a cam ring $b^8$ provided at its top with a recess $b^9$, and it is inside of these cam rings that the ends of the bar $b^7$ slide or move around the axle $b$. As shown, it will be seen that there are three sets of rake teeth $b^6$, and that when one set is held in a lowered position to catch the hay, the preceding set is held in position to deliver its load to the lower end of the elevator, as shown more clearly in Fig. 3. It will be understood, of course, that these rake teeth do not revolve in the same direction that the ground wheels do, but, to the contrary, rotate or revolve in an opposite direction, so as to carry the accumulations of hay outward and deliver the same to the lower end of the elevator. In other words, the rake teeth revolve against the forward motion of the machine, while the ground wheels revolve with the forward motion thereof, in the manner of ordinary vehicle wheels.

In order that the rake teeth may all remain stationary for a time, and then move forward a step, I provide a reciprocating hook or dog I having its forward end adapted to rest upon and engage the outer ends of the rake tooth bars $b^5$. This reciprocating hook or dog is carried by the lower end of a walking beam or lever $i$, the upper end of which latter is connected by a link or pitman $i^1$ with the crank arm $i^2$ on the shaft $e$. In this way, the said hook or dog I is given a reciprocating motion, and upon each full backward stroke it engages one of the rake tooth bars $b^5$ and produces a partial rotation of the entire raking mechanism; and then the forward reciprocation of the said hook or dog I simply brings the same to the end of its forward stroke without causing any rotation of the raking mechanism. In order to prevent back rotation of the raking mechanism, a locking dog J is provided and held in place by a spring $j$ which connects it with the said actuating dog I. The said locking dog J is adapted, it will be seen, to engage the bars $b^5$ to prevent back rotation of the rake teeth.

Referring to Fig. 3, the parts marked $b^{10}$ and $b^{11}$ show a device for throwing the raking teeth out of gear. By raising the handle $b^{10}$, the two arms coming in contact with J and J, will assume a perpendicular position, spreading the arms apart, so that they cannot come in contact with the pipes or bars $b^5$ of the cylinder. This is quite useful when it is found desirable to throw the raking device out of action when passing over a meadow in which old hay or stubble has been allowed to accumulate. It would not be desirable to rake this up with the new hay, and at this time the raking device can be thrown out of action by manipulating $b^{10}$, permitting the rake teeth $b^6$ to step along on top of this ground, revolving in the same direction as the ground wheels of the machine. On passing over foul ground of this kind, $b^{10}$ can be thrown back in the position as shown in Fig. 3, when the cylinder with its rake teeth will be intermittently revolved in the opposite direction, and at once become effective for raking up the hay. It will be understood, of course, that the elements thus described for intermittently actuating the rake teeth in a rotary or circular direction are duplicated at the other side of the machine, whereby actuation of the raking mechanism is insured at each end of the rake teeth bars. With such arrangement, the forward motion of the machine over a field causes a continuous travel or operation on the part of the elevator, and an intermittent or periodic circular motion or operation on the part of the drum-like raking mechanism. In this way, one set of rake teeth is raking up and collecting the hay while the preceding set is delivering its load to the elevator, and for a proper distance or length of travel over the field all of the teeth are held stationary,—that is to say, the raking mechanism is held stationary until one set of rake teeth is entirely loaded and until the preceding set is entirely unloaded. After this, the rake teeth are advanced one step, or just sufficient to bring the loaded set into position to unload and the succeeding or following set into position to load; and this raking and delivering operation is repeated at intervals according to the character of the gearing.

It is obvious, of course, that any other suitable arrangement can be employed for giving the rake teeth an intermittent rotary or circular motion. It will also be seen, however, that upon the arrival of each loaded set of rake teeth at the point where it is to deliver its load to the elevator, its bar $b^7$ is allowed to spring suddenly upward and into the recesses $b^9$ of the cam rings, thus giving the set of rake teeth a sudden downward tilting motion in a backward direction, so to speak, permitting the rake teeth to assume a more nearly horizontal position so that the hay can be readily raked off by the teeth in the carrier marked $g$. In other words, it will be seen that the elevator teeth sweep forward and wipe the hay off from the rake teeth, and that at the moment when the rake teeth arrive at the point of delivery to the elevator, they are given a sudden movement downwardly and practically out from under the hay,—that is to say, the rake teeth practically drop out from under the hay and leave the latter up in the air, where it is caught by the forwardly traveling teeth on the elevator. Thus it will be seen that I deliver the hay intermittently to the elevator, and that the latter operates continuously in the manner of all link-belt or chain conveyers. In other words, the raking up of the hay and delivering of the same into the elevator is intermittent in character, but the elevating of the hay is continuous, and is not characterized by any interruptions.

With the elevator entirely outside or above the floor or incline, it is possible to employ a swinging section K for the upper portion of said incline, which section is hinged at $k$ in the manner shown in Fig. 1. A prop or adjustable brace $k^1$ can be hinge-connected with the said swinging section of the floor or incline, and can have its lower end provided with notches $k^2$ adapted to engage bolts $k^3$ on the frame bars or braces $k^4$. In this way the said swinging section of the floor or incline can be held at any desired angle, and the whole can be discharged at a point between the upper and lower ends of the elevator. It is well known that this method of lowering the hay has many advantages over the loaders which can only discharge at the extreme upper end thereof. Consequently, I combine a continuously operated and endless conveyer with means by which the same can be caused to discharge the hay either at its upper end or at some intermediate point in its upward course of travel.

What I claim as my invention is:

1. In a hay loader, the combination of a plurality of sets of rake teeth, means for actuating said teeth intermittently in a circular or rotary direction, and an elevator for taking the hay from one set of rake teeth while the succeeding or following set is being loaded.

2. In a hay loader, the combination of rake teeth, means for intermittently actuating said teeth in a circular or rotary direction, means for taking the hay from said teeth, said teeth being arranged in a plurality of sets, and means for automatically dropping each set of teeth upon arrival at the point of delivery.

3. In a hay loader, the combination of a plurality of intermittently actuated sets of rake teeth, means for delivering or taking the hay from the said rake teeth, automatic means for dropping each set of teeth upon arrival at the point of delivery, and means for preventing back rotation of said rake teeth.

4. In a hay loader, the combination of a floor or incline, an endless conveyer arranged entirely above said floor or incline, a swinging section for said floor or incline permitting the elevator to discharge at a point between its upper and lower ends, rotary mechanism for raking up and delivering the hay to said conveyer, comprising a plurality of sets of rake teeth, together with means for actuating said teeth intermittently in a circular or rotary direction, and means for taking the hay from one set of rake teeth while the succeeding or following set is being loaded.

5. In a hay loader, the combination of a continuously running endless elevator, rotary mechanism for raking up and delivering the hay to said elevator comprising a plurality of sets of rake teeth, together with means for actuating said teeth intermittently in a circular or rotary direction, and means for discharging the hay at a point between the upper and lower ends of said elevator.

Signed by me at Lost Nation, Iowa this 27th day of December 1906.

NORMAN O. HENDERSON.

Witnesses:
L. RUTENBECK,
R. M. GABLE.